(12) United States Patent
Pettitt et al.

(10) Patent No.: US 6,594,387 B1
(45) Date of Patent: Jul. 15, 2003

(54) ENHANCED COLOR CORRECTION

(75) Inventors: Gregory S. Pettitt, Rowlett, TX (US); Bradley W. Walker, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/561,160

(22) Filed: Apr. 28, 2000

Related U.S. Application Data
(60) Provisional application No. 60/131,733, filed on Apr. 30, 1999.

(51) Int. Cl.⁷ .................................................. G06K 9/00
(52) U.S. Cl. ...................... 382/167; 358/516; 358/518
(58) Field of Search ................................. 382/162–167; 358/515–540; 345/598–609

(56) References Cited

U.S. PATENT DOCUMENTS

| | | | | |
|---|---|---|---|---|
| 5,335,096 A | * | 8/1994 | Shimazaki | 358/518 |
| 5,512,961 A | * | 4/1996 | Cappels | 348/658 |
| 5,588,050 A | | 12/1996 | Kagawa et al. | 382/167 |
| 5,729,636 A | | 3/1998 | Kagawa et al. | 382/274 |
| 5,754,448 A | * | 5/1998 | Edge et al. | 358/518 |
| 5,917,959 A | | 6/1999 | Kagawa et al. | 382/276 |
| 6,453,067 B1 | * | 9/2002 | Morgan et al. | 382/162 |

OTHER PUBLICATIONS

U.S. patent application Ser. No. 09/175,810, Morgan et al., filed Oct. 20, 1998.

* cited by examiner

*Primary Examiner*—Jingge Wu
(74) *Attorney, Agent, or Firm*—Charles A. Brill; Wade James Brady, III; Frederick J. Telecky, Jr.

(57) ABSTRACT

A method and apparatus for correcting the color of an image signal. Data in a first color space such as RGB is converted (502) to primary/secondary/neutral color space by setting neutral color word equal to the minimum of the input values, the primary color word equal to the maximum of the input values minus the neutral color word, and the secondary color word equal to the median of the input values minus the neutral color word. A set of three coefficients is selected (506) for each of the primary color word, the secondary color word, and the neutral color word. The primary, secondary, and neutral color words are then multiplied by the coefficients by a matrix multiplier (504) to yield color-corrected data in the first color space.

12 Claims, 5 Drawing Sheets

ENHANCED COLOR CORRECTION

CROSS-REFERENCE TO RELATED APPLICATIONS

This application claims priority under 35 USC §119(e)(1) of provisional application No. 60/131,733 filed Apr. 30, 1999.

The following patents and/or commonly assigned patent applications are hereby incorporated herein by reference: Ser No. 09/175,810 filed Oct. 20, 1998 entitled "Brightness Gain using White Segment with Hue and Gain Correction."

FIELD OF THE INVENTION

This invention relates to the field of display systems, more particularly to color correction of display systems, particularly display systems using primary color sources to generate full color images.

BACKGROUND OF THE INVENTION

Image display systems create images for a human viewer to experience. The goal of the display systems is to simulate the experience of being at the location being displayed. These locations may be real, for example when a scene is recorded using a camera, imaginary, for example when a computer generates a scene using a database of shape and texture information, or a combination of real images and superimposed computer generated images.

Regardless of the source of a particular image, the display system must be able to recreate the complex color tones and intensities in order to make the recorded image appear life-like. To do this, the color spectrum of the display system must be correlated to the color spectrum of the device used to capture the image. This can be a particular challenge when displaying an image initially recorded on a subtractive color media such as cinemagraphic film on an additive color-based system such as a CRT, LCD, or DMD display.

Color is a perceptual characteristic, requiring a human viewer. The perceived color of an object is determined by the spectral power distribution of the light emitted by or reflected by the object and the response of the human visual system. The human eye contains sensors, called rods and cones, that detect the light from the object focused on the retina. Rods are responsible for low light vision. Cones are responsible for color vision. There are three types of cones in the human eye, each with a distinct pass band. Using the output from the three types of cones, the human brain creates the perception of color and intensity for each portion of an image.

Subtractive color systems and additive color systems create the sensation of color for each portion of an image in opposite manners. Subtractive color media, such as photographic film, use dyes to absorb the unwanted portions of the spectrum of light from a source while reflecting or transmitting the portions needed to create an image. Additive color systems, such as CRT and micromirror displays, source primary colored light to an image. Neither color system recreates the entire spectrum of the original image, but instead creates the perception of the original image by stimulating the three types of cones to produce a perceptual response that is the same as provided by the original spectrum. Thus, three or more carefully chosen light sources (e.g. red, green, and blue) can be used to provide the perception of a continuous color spectrum.

The three colors chosen to be the primary colors of an additive color display system determine the available color space of the display system. While a given set of primary colors may provide a very broad color space, the use of filters to select the given set of primary colors from a white light beam often limits the maximum intensity the display system is capable of producing to less than a minimum acceptable amount. Likewise, a given selection of color filters may result in a white level, formed by combining the primary colors, that has an undesirable color tint.

While an ideal display can create a high intensity display of very pure colors including white, real world display systems must make tradeoffs between the white level, purity of the primary colors, and the maximum available brightness. These tradeoffs affect the secondary colors since the secondary colors are formed by combining two or more primary colors. Thus, once the primary color filters are selected, the white point and the purity of the secondary colors is also determined.

SUMMARY OF THE INVENTION

Objects and advantages will be obvious, and will in part appear hereinafter and will be accomplished by the present invention which provides a method and system for the enhanced color correction of image data. One embodiment of the claimed invention provides a method of correcting color image data for a pixel. The method comprising the steps of: providing intensity data for three primary colors, three secondary colors, and a neutral color for the pixel; providing a set of matrix coefficients for each output primary color, one said coefficient for describing the contribution said output primary color makes to each of the primary, secondary, and neutral colors; and summing the products of the matrix coefficients and corresponding intensity data to provide a corrected intensity data value for each output primary.

According to a second embodiment of the disclosed invention, a method of correcting color image data for a pixel is disclosed. The method comprising the steps of: providing image data for the pixel, converting the image data to a color space having a primary, secondary, and neutral color component; providing coefficients describing the contribution made each of three output primary colors to the formation of said primary, secondary, and neutral color components; and summing the products of said coefficients and said primary, secondary, and neutral color components to provide a corrected intensity data value for each output primary.

According to yet another embodiment of the disclosed invention, a method of correcting color image data for a pixel is disclosed. The method comprising the steps of: providing image data for said pixel; converting said image data to a color space having a primary (P), secondary (S), and neutral (N) color component; selecting a set of coefficients describing the contribution of the primary, secondary, and neutral components to the output primaries, and calculating a corrected output value for each said output primary according to the following equation:

$$\begin{bmatrix} R' \\ G' \\ B' \end{bmatrix} = \begin{bmatrix} X_{RP} & X_{RS} & X_{RN} \\ Y_{GP} & Y_{GS} & Y_{GN} \\ Z_{BP} & Z_{BS} & Z_{BN} \end{bmatrix} \begin{bmatrix} P \\ S \\ N \end{bmatrix}$$

where:
$X_{RP}$ is the contribution of the primary color component to a first output primary (R')
$X_{RS}$ is the contribution of the secondary color component to the first output primary (R')

$X_{RN}$ is the contribution of the neutral color component to the first output primary (R')

$Y_{GP}$ is the contribution of the primary color component to a second output primary (G')

$Y_{GS}$ is the contribution of the secondary color component to the second output primary (G')

$Y_{GN}$ is the contribution of the neutral color component to the second output primary (G')

$Z_{BP}$ is the contribution of the primary color component to a third output primary (B')

$Z_{BS}$ is the contribution of the secondary color component to the third output primary (B')

$Z_{BN}$ is the contribution of the neutral color component to the third output primary (B')

The disclosed methods and systems provide independent control over the primary and secondary image colors, as well as over the neutral color component—typically the white level. As implemented, the described methods and systems require very little additional processing power compared to traditional color correction matrixing approaches, and therefore can be implemented in real time without excessive cost.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

As described above, the spectrum and maximum intensity of the primary color sources, whether color filters acting on a white light beam or light sources capable of outputting light in a portion of the visible spectrum, determine several key characteristics of a display system such as the white point and the purity of the secondary colors.

For example, a system designer may select a green color filter with a relatively broad pass band in order to provide a very high number of lumens to the projected image—especially when coupled with a light source that outputs a high proportion of its energy in the green spectrum band. The disproportionate amount of green light contributed to the white light output, however, results in the white light having a greenish tinge. While the excess green contributed to the white light may not be objectionable, the high green level will result in secondary colors such as yellow and cyan having too much green. What is needed is an efficient way to individually adjust the purity of not only the primary colors, but also the secondary colors and the white point.

A method and apparatus has been developed that enables individual control of multiple color properties in a primary color display system. The method and apparatus disclosed herein allow the system designer great flexibility in the selection of primary color sources, while providing a means to compensate for the undesirable side effects of the combination of primary color sources.

While the method and apparatus taught herein will be disclosed primarily in terms of a three-color primary system that uses a white light source in conjunction with three color filters to provide three light beams that are perceived as a primary color, it should be understood that this disclosure is intended to include applications using other means of providing the primary colors such as separate light sources, separate primary color light sources, beam splitters, color wheels, etc. Furthermore, although this disclosure primarily describes a display system using Red, Green, and Blue (RGB) primary colors, it is intended to include and address other color systems, whether additive or subtractive, such as systems whose primary colors include Cyan, Magenta, and Yellow (CMY), Cyan, Magenta, Yellow and Black (CMYK), and luminance and chrominance (YUV). The method and apparatus taught herein describes a neutral color component that is white (W). Other choices for the neutral component can be uses as needed.

Figure 1:
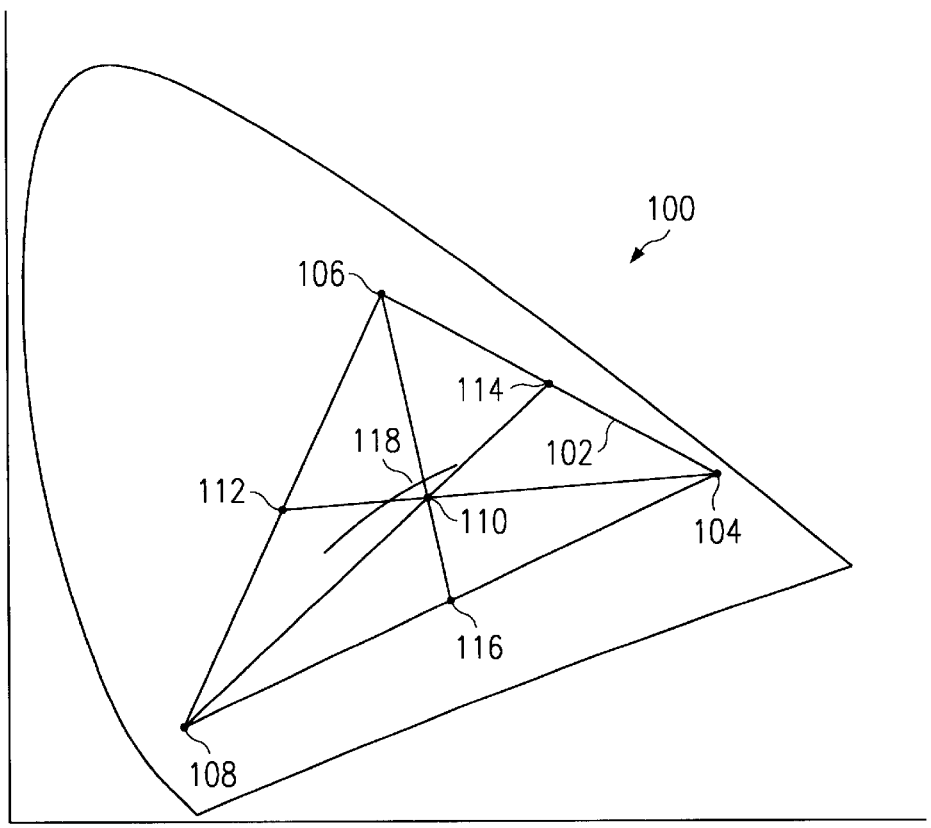
FIG. 1 is a CIE 1931 xy chromaticity diagram of the color space of a first display system.

FIG. 1 is a CIE 1931 xy chromaticity diagram 100 of a first display system. The color space 102 of the display system is determined by the location of the system's red point 104, blue point 108, green point 106, and the relative intensity of the light provided at each of these primary color points. A weighted combination of the primaries determines the location of the secondary color points, with the weighting determined by the response of the eye. The white point 110 will be located at the intersection of the lines connecting the primary and secondary colors as shown in FIG. 1. In FIG. 1, the cyan point 112, yellow point 114, and magenta point 116, are all located midway between the primary color points. The white point 110 shown in FIG. 1 is slightly to the magenta side of a reference white line 118.

Figure 2:
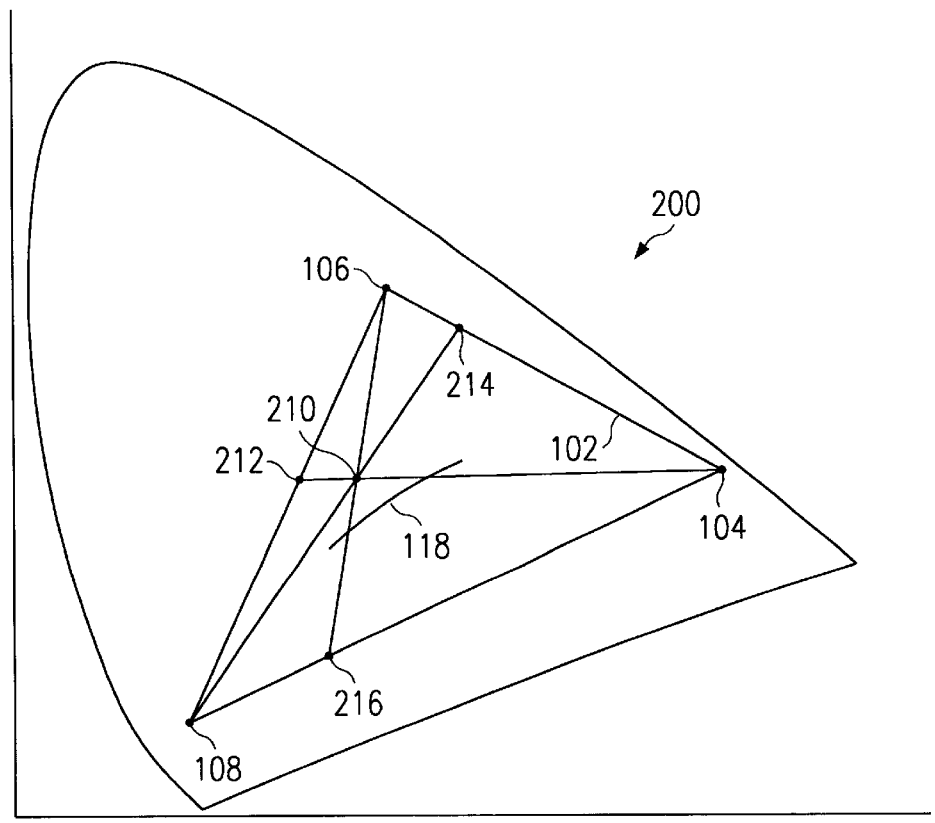
FIG. 2 is a CIE 1931 xy chromaticity diagram of the color space of a second display system showing shifted secondary color points.

FIG. 2 is a chromaticity diagram 200 of a second display system. The second display system has the same red, green, and blue points as the display system represented in FIG. 1, but because the primary colors have changed in relative intensity, the secondary color points, as well as the white point, are shifted. In the example shown in FIG. 2, a reduction in the relative intensity of the red and blue light sources results in a white point 210 that is shifted toward cyan. The yellow point 214 is shifted toward the green point 106, and the magenta point 216 is shifted toward the blue point 108. Although the display system represented by FIG. 2 provides a lot of illumination to a white point that is suitably close to the reference white line 118, when the display system attempts to display a non-primary color represented by linear RGB data, the color will have a cyan tint.

One means of compensating for the undesirable side effects of a given set of primary color sources is to provide secondary color and white information as well as the primary color information, and to use this additional information to generate a set of output primary data that compensates for the undesirable side effects. The secondary color and white intensity information is used to alter the amount each primary color source contributes to the secondary colors and white. In effect, this method transforms a three primary color system into a seven primary color system (RGBCMYW) including the three primary colors (RGB), the three secondary colors (CMY), and white (W) by remapping the color space to provide additional control over the secondary colors and white. The remapping system can be written as:

$$\begin{bmatrix} R' \\ G' \\ B' \end{bmatrix} = \begin{bmatrix} a & b & c & d & e & f & g \\ h & i & j & k & l & m & n \\ o & p & q & r & s & t & u \end{bmatrix} \begin{bmatrix} R \\ G \\ B \\ C \\ M \\ Y \\ W \end{bmatrix} \quad \text{Equation 1}$$

Analysis of Equation 1 reveals that the coefficients represent three groups of signals: primary color (P) coefficients, represented by a, b, c, h, i, j, o, p, and q; secondary color (S) coefficients, represented by d, e, f, k, l, m, r, s, and t; and white (W) coefficients, represented by g, n, and u. The remapping of the seven primary color system to the RGB space is shown in Equation 2.

$$\begin{bmatrix} R' \\ G' \\ B' \end{bmatrix} = \begin{bmatrix} 1 & 0 & 0 & 0 & 1 & 1 & 1 \\ 0 & 1 & 0 & 1 & 0 & 1 & 1 \\ 0 & 0 & 1 & 1 & 1 & 0 & 1 \end{bmatrix} \begin{bmatrix} R \\ G \\ B \\ C \\ M \\ Y \\ W \end{bmatrix} \quad \text{Equation 2}$$

Furthermore, it is evident that each primary and secondary color, as well as white, can be controlled independently. For example, by setting the coefficient in location "m" to a value less than 1, the amount of green contributing to a yellow color is reduced, without affecting the contribution of green to white, pure green, or cyan. Each color, including the primary colors, can be manipulated in a similar manner—coefficient "p" allows blue to be added to green.

Figure 3:
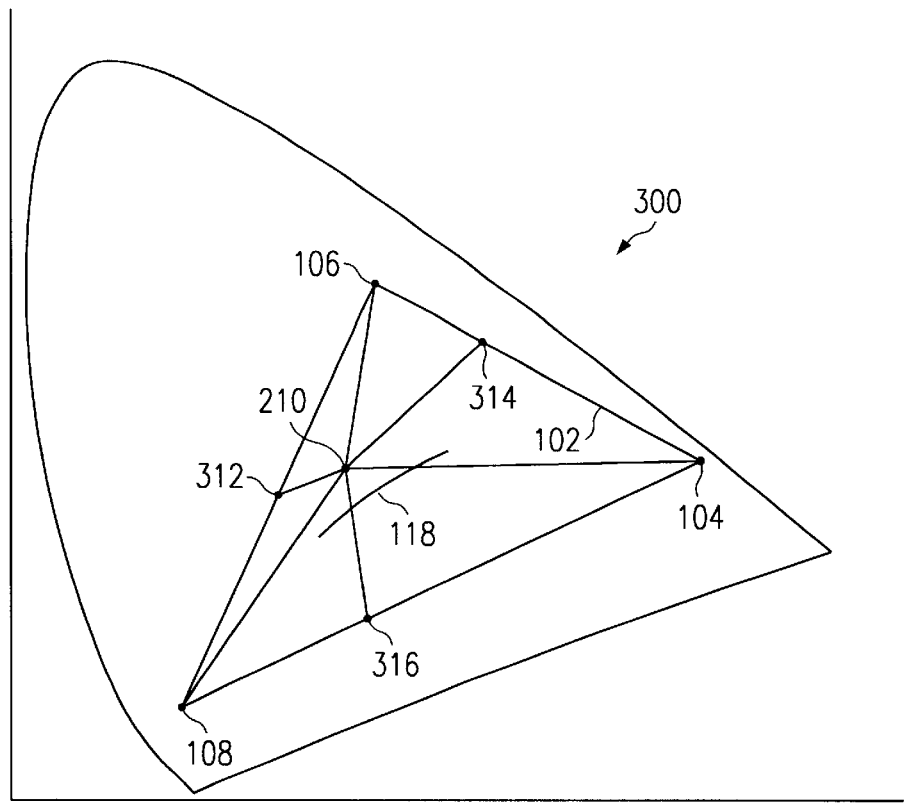
FIG. 3 is a CIE 1931 xy chromaticity diagram of the color space of a third display system showing the independent adjustment of the secondary color points.

The matrix of Equation 1 provides a powerful tool for the independent control of each of the seven colors (RGBCYMW). FIG. 3 is a chromaticity diagram 300 for the display system represented in FIG. 2 after the secondary colors have been altered as described above. Equation 3 shows the matrix used to manipulate the system represented by FIG. 3. As shown in FIG. 3, the yellow point 314 and magenta point 316 have been moved toward the red point 104, while the cyan point 312 has been moved toward the blue point 108.

$$\begin{bmatrix} R' \\ G' \\ B' \end{bmatrix} = \begin{bmatrix} 1 & 0 & 0 & 0.02 & 1 & 1 & 1 \\ 0 & 1 & 0 & 0.7371 & 0.0047 & 0.5013 & 1 \\ 0 & 0 & 1 & 1 & 0.6417 & 0.001 & 1 \end{bmatrix} \begin{bmatrix} R \\ G \\ B \\ C \\ M \\ Y \\ W \end{bmatrix} \quad \text{Equation 3}$$

The method taught thus far provides a very valuable tool for adjusting the color response of a display system. The implementation of Equations 1–3 in a high resolution display system requires up to 21 multiplication operations, each using 14 bit inputs, 10 to 14 bit coefficients, and providing 14 bit outputs. The image data easily may be processed as described in Equations 1–3 and stored for later display. Performing the computations in real time, however, requires more processing power than is economically feasible to include in many display systems at this time. Therefore, there is a great need to simplify the calculations in order to enable the inclusion of the color space control features in display systems that do not have sufficient processing power to implement Equations 1–3.

Figure 4:
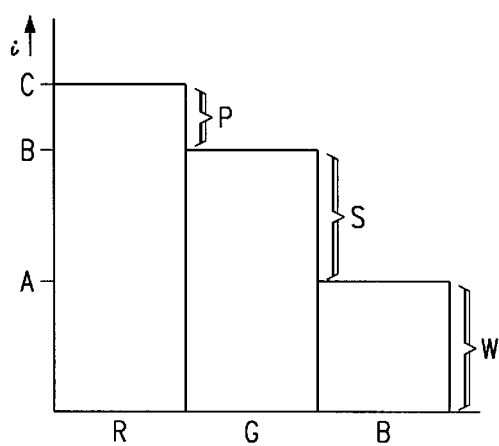
FIG. 4 is a graph of three hypothetical primary color intensity data values for a single pixel showing the allocation of the RGB data into PSW space.

FIG. 4 is a graph of an example of three primary color intensity data values for a single pixel. In FIG. 4, the minimum of the three primary color values is the blue intensity value—which has an intensity of "A." Since all three of the primary colors have an intensity of "A" or greater, the quantity "A" represents the white (W) component of the pixel. Therefore, the minimum primary color value, in this case blue, contributes only to the white component of the pixel.

After allocating the minimum primary color intensity value to the white component of the pixel, the two remaining primary colors are seen to contribute to one of the secondary colors. In the example of FIG. 4, the two remaining primary colors, red and green, form yellow. The intensity of the yellow component (Y) is equal to the minimum of the two remaining primary color intensity words after the subtraction of the white value from both words. In FIG. 4, the secondary color value is equal to S, the result of B–A. Therefore, the median primary color value, in this case green, contributes to both the white component and the yellow component of the pixel.

The remaining primary color intensity value, shown in FIG. 4 as P=C–B, is the primary component of the pixel in primary-secondary-white (PSW) color space. Thus, the pixel represented in FIG. 4 has a red component, a yellow component, and a white component. Assuming the input R value was 250, the input G value was 200, and the input B value was 100, the pixel is represented by all of the following matrices:

$$\begin{bmatrix} R \\ G \\ B \end{bmatrix} = \begin{bmatrix} 250 \\ 200 \\ 100 \end{bmatrix} \quad \text{Equation 4}$$

$$\begin{bmatrix} R \\ G \\ B \\ C \\ M \\ Y \\ W \end{bmatrix} = \begin{bmatrix} 250 \\ 200 \\ 100 \\ 0 \\ 0 \\ 0 \\ 0 \end{bmatrix} \quad \text{Equation 5}$$

$$\begin{bmatrix} R \\ G \\ B \\ C \\ M \\ Y \\ W \end{bmatrix} = \begin{bmatrix} 50 \\ 0 \\ 0 \\ 0 \\ 0 \\ 100 \\ 100 \end{bmatrix} \quad \text{Equation 6}$$

$$\begin{bmatrix} P \\ S \\ W \end{bmatrix} = \begin{bmatrix} 50 \\ 100 \\ 100 \end{bmatrix} \quad \text{Equation 7}$$

Analysis of Equations 4–7 reveals that, any combination of the seven primary color input values (RGBCMYW) can be expressed using only three values, a primary color, a secondary color, and a white level, in PSW color space. The resulting PSW matrix is shown in Equation 8.

$$\begin{bmatrix} R' \\ G' \\ B' \end{bmatrix} = \begin{bmatrix} X_{RP} & X_{RS} & X_{RW} \\ Y_{GP} & Y_{GS} & Y_{GW} \\ Z_{BP} & Z_{BS} & Z_{BW} \end{bmatrix} \begin{bmatrix} P \\ S \\ W \end{bmatrix} \quad \text{Equation 8}$$

The difficulty of implementing Equation 8 is the determination of the values for the coefficients $X_{RP}$, $X_{RS}$, $Y_{GP}$, $Y_{GS}$, $Z_{BP}$, and $Z_{BS}$. Review of Equation 2 shows that the first three columns of the coefficient matrix are used to control the primary colors, the second group of three columns of the coefficient matrix are used to control the secondary color, and the last column controls the white color. Thus, the coefficients for Equation 8 may be taken directly from the coefficients of Equation 1—all that is required is to select the columns based on the identity of the primary and secondary colors of Equation 8, which is determined by the relative strengths of the red, green, and blue inputs. The first column of these values, $X_{RP}$, $X_{RS}$, and $Y_{GP}$, is the column of coefficients for the corresponding primary color from Equation 1. The second column of these values, $Y_{GS}$, $Z_{BP}$, and $Z_{BS}$, correspond to the coefficients for the corresponding secondary color from Equation 1.

If the maximum of the three RGB input intensity values is the red intensity value, the first column of the coefficient matrix is used for the first column, $X_{RP}$, $X_{RS}$, and $Y_{GP}$, of Equation 8. The second column is used when the green intensity value is the maximum, and the third column is used when the blue intensity value is the maximum.

When the red input intensity value is less than both the green and blue values, then red does not contribute to either the primary or secondary colors, but only to the white level. Therefore, the proper secondary color is cyan and the fourth column of the coefficient matrix of Equation 1 is used as the second column, $Y_{GS}$, $Z_{BP}$, and $Z_{BS}$, of Equation 8. Likewise, when the green intensity value is the minimum, the secondary color is magenta and the fifth column of the coefficient matrix is used, and when the blue intensity value is the minimum, the secondary color is yellow and the sixth column of the coefficient matrix is used. Thus, there are six different combinations of coefficients from Equation 1 that are used by Equation 8.

Figure 5:
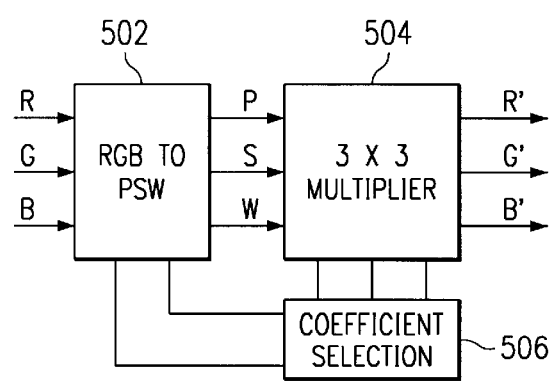
FIG. 5 is a block diagram depicting one embodiment of an apparatus for improving color correction.

FIG. 5 is a block diagram depicting one embodiment of the improved color correction. In FIG. 5, RGB data for a given pixel is input into the RGB to PSW converter 502. The RGB to PSW converter 502 compares the three intensity values and outputs the greatest on signal P, the median on signal S, and the minimum on signal W. P, S, and W are then driven to one set of inputs in the 3×3 multiplier 504. The RGB to PSW converter 502 also drives two signals to a coefficient selection block 506. The coefficient selection block 506 provides the coefficients used by the 3×3 multiplier 504. The output of the 3×3 multiplier 504 is the processed RGB data of Equation 8.

Figure 6:
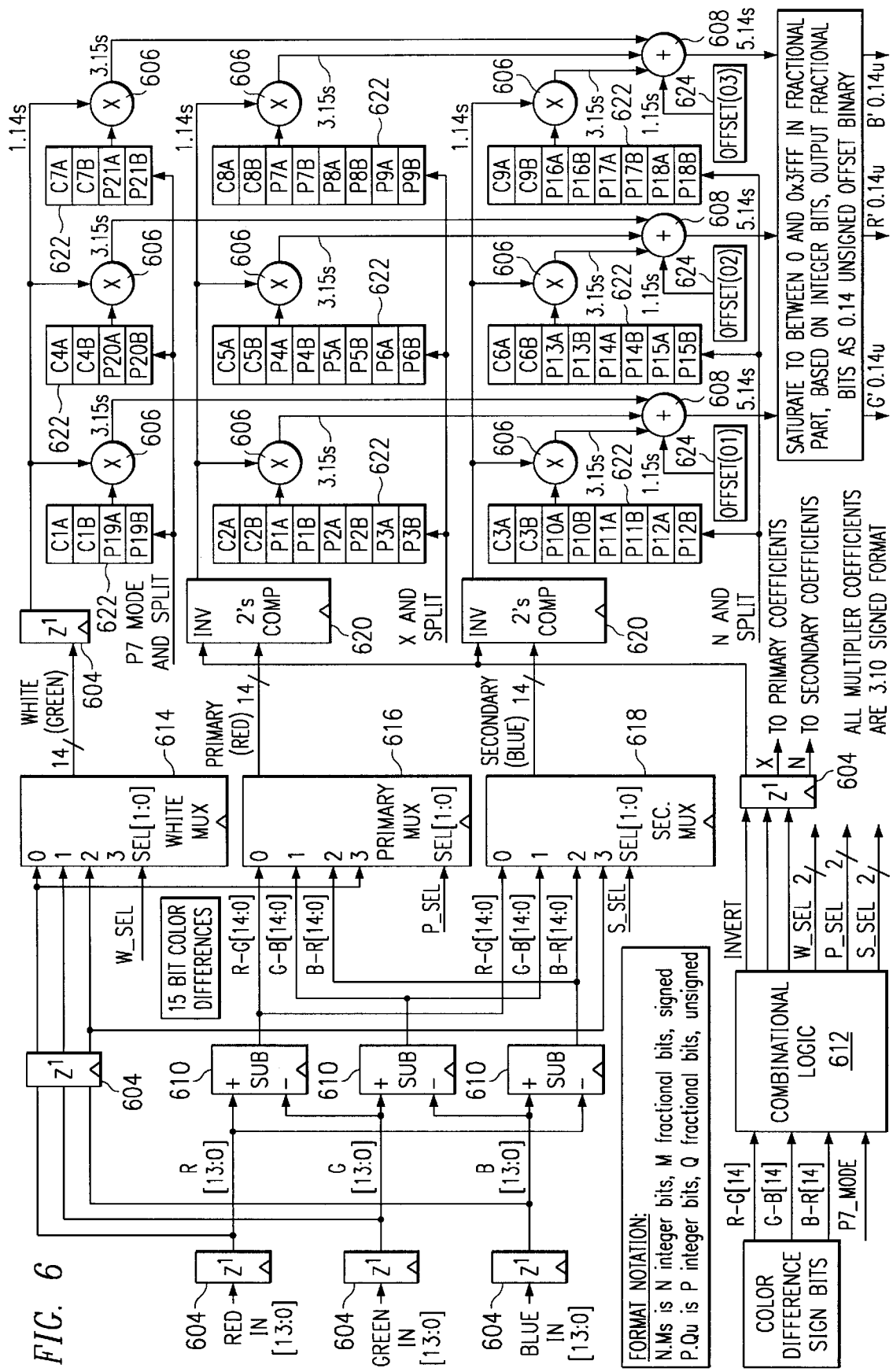
FIG. 6 is a circuit diagram showing one implementation of the improved color correction.

FIG. 6 is a schematic diagram of one possible circuit for implementing the methods described herein. The circuit of FIG. 6 implements either Equation 9 or Equation 10, depending on the polarity of the mode select signal (P7_Mode). When Equation 9 is implemented, the enhanced color correction is not implemented. Several delay blocks 604 are used to synchronize the circuit of FIG. 6. The adders 608 and multipliers 606 are also clocked. In FIG. 6, blocks 610 perform a clocked subtraction of various combinations of the delayed RGB data. The sign bit from the result of each subtraction is used by the combinatorial logic block 612 to determine which of the RGB inputs had the maximum, median, and minimum value.

$$\begin{bmatrix} G' \\ R' \\ B' \end{bmatrix} = \begin{bmatrix} C1 & C2 & C3 \\ C4 & C5 & C6 \\ C7 & C8 & C9 \end{bmatrix} \begin{bmatrix} G \\ R \\ B \end{bmatrix} \quad \text{Equation 9}$$

$$\begin{bmatrix} G' \\ R' \\ B' \end{bmatrix} = \begin{bmatrix} P1 & P2 & P3 & P10 & P11 & P12 & P19 \\ P4 & P5 & P6 & P13 & P14 & P15 & P20 \\ P7 & P8 & P9 & P16 & P17 & P18 & P21 \end{bmatrix} \begin{bmatrix} G \\ R \\ B \\ M \\ C \\ Y \\ W \end{bmatrix} \quad \text{Equation 10}$$

The output of the combinatorial logic block 612 is used to gate the proper RGB value, the minimum of the three RGB values, through the clocked white multiplexer 614, after which the white value is delayed one clock before being input to the multipliers 606. Other outputs of the combinatorial logic block 612 gate the proper input, the difference between the median and minimum RGB values, through the secondary color multiplexer 618, and the difference between the maximum and median RGB values through the primary color multiplexer 616. The outputs of the primary and secondary color multiplexers 616, 618, are passed through conditional 2's complement inverters 620 before being input to a set of multipliers 606. The conditional 2's complement inverters 620 invert their input signals when the inputs are negative—in effect providing the absolute value of the subtraction operation.

When the enhanced color correction mode is disabled, green data is passed through the white channel multiplexer 614, red data is passed through the primary channel multiplexer 616, and blue data is passed through the secondary channel multiplexer 618. The outputs of the multiplexers 614, 616, and 618, are delayed by the conditional 2's complement inverters 620 or a delay block 604 before being input to the multipliers. The second input to each multiplier 606 is selected from a set of coefficients stored in a memory 622 associated with each multiplier 606.

Only one location of the memories 622 associated with the white channel is necessary in order to store the Px coefficient needed to implement the enhanced color correction. To allow the enhanced color correction to be disabled, however, a second memory location is provided to store the Cx coefficient. The primary and secondary channels require three locations to store the coefficients, for example P1, P2, and P3 are stored in the primary and G' channel.

The memories 622 of FIG. 6 show an interleaved set of memory locations. These locations are used to store a second set of coefficients that are accessed to facilitate testing of various coefficients. The test signal "Split" is used to select between the two versions of each coefficient. By toggling Split during a frame, various image pixels will use the "A" set of coefficients while the remainder of the pixels will use the "B" set of coefficients. Thus, the effects of various sets of coefficients can be compared directly. The offset 624 inputs to the adders 608 are also provided for testing purposes.

The concepts taught herein can be extended to the use of other points in the color space without departing from the intended teachings hereof. For instance, the color correction can be implemented before or after a gamma correction operation, or implemented as part of the degamma scaling operation. Likewise, other embodiments use logic thresholds to sample the $YC_RC_B$ values to determine the proper primary and secondary colors and implement the color correction techniques in the $Y'C_R'C_B'$ to R'G'B' conversion matrix.

The color correction described herein is applicable to both additive and subtractive color systems. The term "neutral primary" will be used to describe the mixture of all of the primary colors whether describing white in an additive system or black in a subtractive system.

Figure 7:
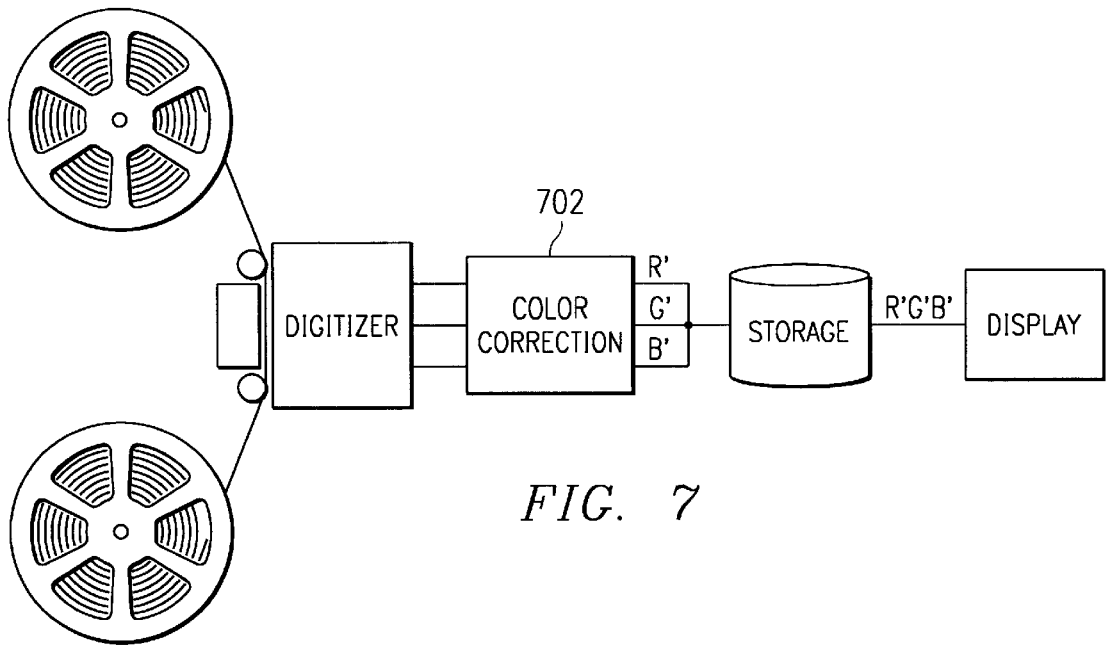
FIG. 7 is a block diagram of a film to video transfer system utilizing the improved color correction of the present invention to translate digitized image data prior to storing and later retrieving and displaying the translated image data.

The color correction described may be performed by an image transfer machine or scanner when capturing or digitizing an image so that color corrected data is produced, or the color correction may be performed by the display system as an image is being displayed. FIG. 7 is a block diagram of a film to video transfer system utilizing the improved color correction 702 of the present invention to translate digitized image data prior to storing the digitized data. The color corrected data is later retrieved and displayed by display system 704.

Figure 8:
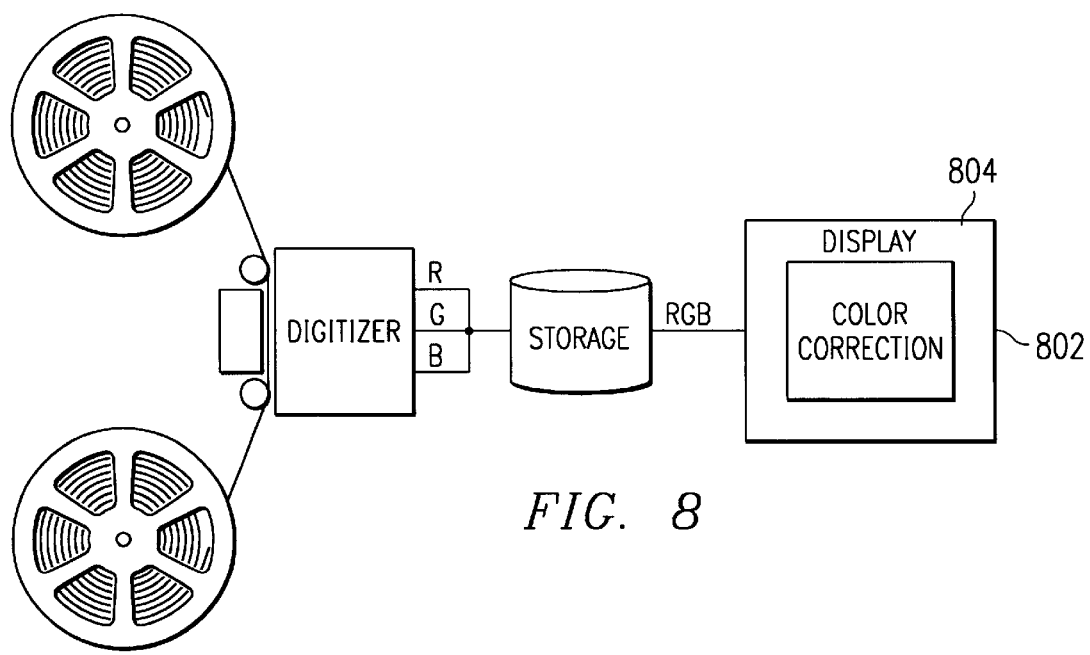
FIG. 8 is a block diagram of a film to video transfer system showing a display device performing the improved color correction operation prior to the display of the transferred video data.

Alternatively, the color correction is included in the display system to provide color correction for input image signals. FIG. 8 is a block diagram showing a display system 802 with the improved color correction 804 capability. The color correction 804 can be selected by a viewer, for example through the use of a remote control and on-screen programming, to enable the viewer to select from several color correction modes. The use of multiple color correction modes allows the user to optimize the color correction based on the selected image source.

Figure 9:
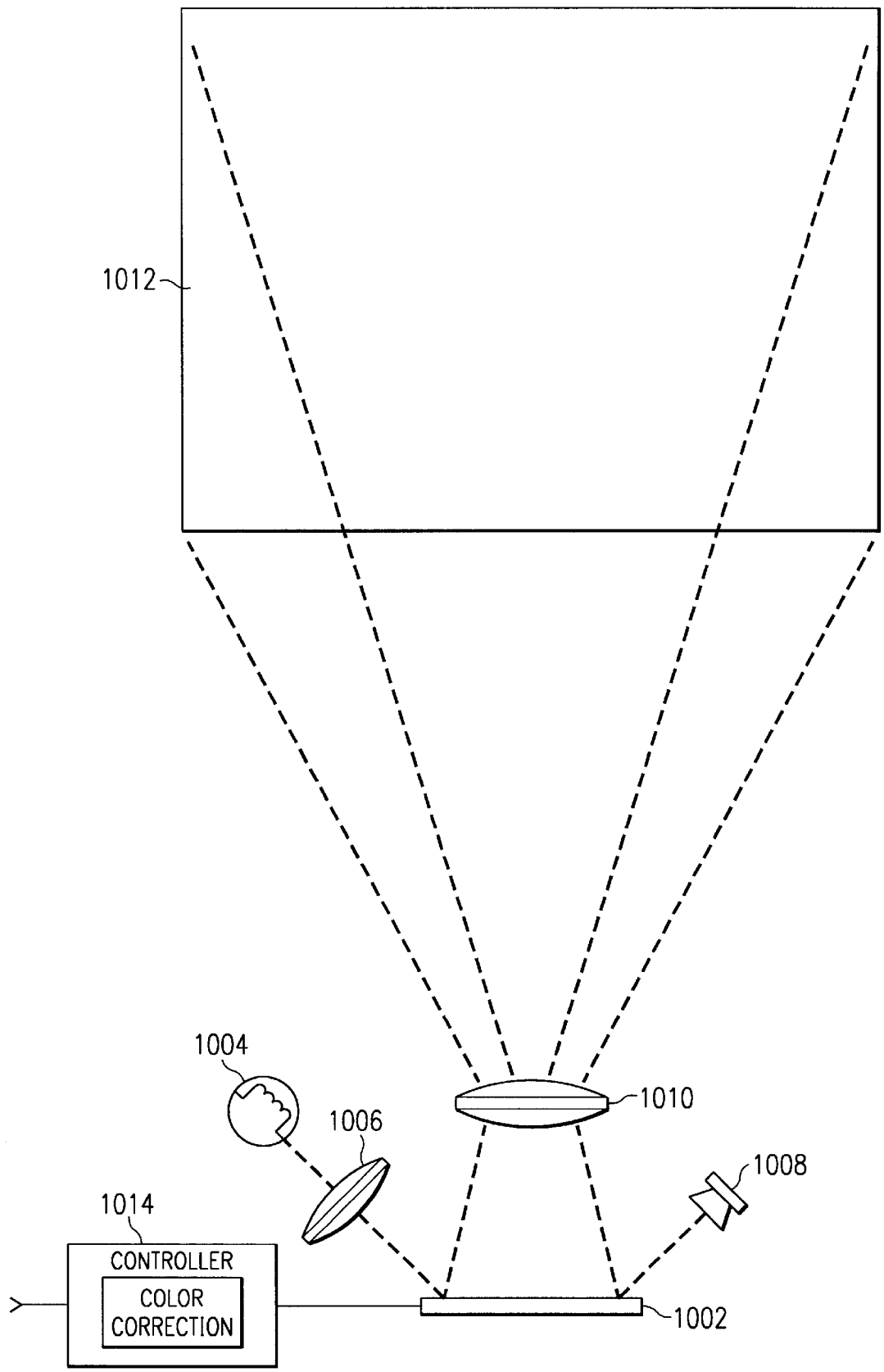
FIG. 9 is a schematic view of a projection display system utilizing the improved color correction of the present invention.

FIG. 9 is a schematic view of an image projection system 1000 incorporating the improved color correction of the present invention. In FIG. 10, light from light source 1004 is focused on a micromirror 1002 by lens 1006. Although shown as a single lens, lens 1006 is typically a group of lenses and mirrors which together focus and direct light from the light source 1004 onto the surface of the micromirror device 1002. Controller 1014 receives image intensity data and control signals and processes them according to the teachings herein to obtain color corrected image intensity data signals. The color corrected image intensity data signals are then transferred from controller 1014 to the micromirror device 1002. The color corrected image intensity data causes some mirrors to rotate to an on position and others to rotate to an off position. Mirrors rotated to an off position reflect light to a light trap 1008 while mirrors rotated to an on position reflect light to projection lens 1010, which is shown as a single lens for simplicity. Projection lens 1010 focuses the light modulated by the micromirror device 1002 onto an image plane or screen 1012.

Thus, although there has been disclosed to this point a particular embodiment for a method and apparatus for improved color correction, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of correcting color image data for a pixel, the method comprising the steps of:

providing intensity data for three primary colors, three secondary colors, and a neutral color for said pixel;

providing a set of matrix coefficients for each output primary color, one said coefficient for describing the contribution said output primary color makes to each of the primary, secondary, and neutral colors; and summing the products of said matrix coefficients and corresponding said intensity data to provide a corrected intensity data value for each output primary.

2. The method of claim 1, further comprising the step of storing said corrected intensity data values.

3. The method of claim 1, further comprising the step of forming an image pixel using said corrected intensity data values.

4. The method of claim 1, further comprising the step of printing an image pixel using said corrected intensity data values.

5. A method of correcting color image data for a pixel, the method comprising the steps of:

providing image data for said pixel, said image data comprising a maximum input intensity value, a median input intensity value, and a minimum input intensity value, each said input intensity value corresponding to one of three primary colors;

converting said image data to a color space having a primary, secondary, and neutral color component, said neutral color component equal to said minimum input intensity value, said primary color component equal to the difference between said maximum input intensity value and said minimum input intensity value, and said secondary color component equal to the difference between said maximum input intensity value and said median input intensity value;

providing coefficients describing the contribution made each of three output primary colors to the formation of said primary, secondary, and neutral color components, said coefficients dependent on which of said three primary colors corresponds to said maximum, median, and minimum input intensity values;

summing the products of said coefficients and said primary, secondary, and neutral color components to provide a corrected intensity data value for each output primary.

6. The method of claim 5, further comprising the step of storing said corrected intensity data values.

7. The method of claim 5, further comprising the step of forming an image pixel using said corrected intensity data values.

8. The method of claim 5, wherein said step of providing coefficients further comprises the step of providing coefficients describing the contribution made each of three output primary colors to the formation of said primary, secondary, and neutral color components, said coefficients dependent on which of said three primary colors corresponds to said maximum, median, and minimum input intensity values and operable to compensate for a gamma correction applied to said image data.

9. A method of correcting color image data for a pixel, the method comprising the steps of:

providing image data for said pixel, said image data comprising a maximum input intensity value, and median input intensity value, and a minimum input intensity value, each said input intensity value corresponding to one of three primary colors;

converting said image data to a color space having a primary (P), secondary (S), and neutral (N) color component, said neutral color component equal to said minimum input intensity value, said primary color component equal to the difference between said maximum input intensity value and said minimum input intensity value, and said secondary color component equal to the difference between said maximum input intensity value and said median input intensity value;

providing a dynamic coefficient ($X_{RP}$) describing the contribution of said primary color component to a first output primary (R');

providing a dynamic coefficient ($X_{RS}$) describing the contribution of said secondary color component to said first output primary (R');

providing a dynamic coefficient ($X_{RN}$) describing the contribution of said neutral color component to said first output primary (R');

providing a dynamic coefficient ($Y_{GP}$) describing the contribution of said primary color component to a second output primary (G');

providing a dynamic coefficient ($Y_{GS}$) describing the contribution of said secondary color component to said second output primary (G');

providing a dynamic coefficient ($Y_{GN}$) describing the contribution of said neutral color component to said second output primary (G');

providing a dynamic coefficient ($Z_{BP}$) describing the contribution of said primary color component to a third output primary (B');

providing a dynamic coefficient ($Z_{BS}$) describing the contribution of said secondary color component to said third output primary (B');

providing a dynamic coefficient ($Z_{BN}$) describing the contribution of said neutral color component to said third output primary (B');

calculating a corrected output value for each said output primary according to the following equation:

$$\begin{bmatrix} R' \\ G' \\ B' \end{bmatrix} = \begin{bmatrix} X_{RP} & X_{RS} & X_{RN} \\ Y_{GP} & Y_{GS} & Y_{GN} \\ Z_{BP} & Z_{BS} & Z_{BN} \end{bmatrix} \begin{bmatrix} P \\ S \\ N \end{bmatrix}.$$

10. The method of claim 9, further comprising the step of storing said corrected intensity data values.

11. The method of claim 9, further comprising the step of forming an image pixel using said corrected intensity data values.

12. The method of claim 9, said steps of providing a dynamic coefficient further comprising the step of providing a dynamic coefficient compensating for a gamma correction applied to said image data.

* * * * *